US009395082B2

(12) United States Patent
Tiwary et al.

(10) Patent No.: US 9,395,082 B2
(45) Date of Patent: Jul. 19, 2016

(54) COMBUSTOR RESONATOR SECTION WITH AN INTERNAL THERMAL BARRIER COATING AND METHOD OF FABRICATING THE SAME

(71) Applicant: Siemens Energy, Inc., Orlando, FL (US)

(72) Inventors: Abhijeet Tiwary, Orlando, FL (US); Stephen A. Ramier, Fredericton (CA); Timothy A. Fox, Hamilton (CA); James Bertoncello, Charlotte, NC (US); Steven Williams, Charlotte, NC (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 595 days.

(21) Appl. No.: 13/622,452

(22) Filed: Sep. 19, 2012

(65) Prior Publication Data
US 2013/0074501 A1    Mar. 28, 2013

Related U.S. Application Data

(60) Provisional application No. 61/538,399, filed on Sep. 23, 2011.

(51) Int. Cl.
*F02C 7/24* (2006.01)
*F23R 3/00* (2006.01)
*F23R 3/06* (2006.01)
*F23M 5/00* (2006.01)
*F01N 1/02* (2006.01)
(Continued)

(52) U.S. Cl.
CPC ............ *F23M 5/00* (2013.01); *F01N 1/023* (2013.01); *F02C 7/24* (2013.01); *F23M 20/005* (2015.01); *F23R 3/002* (2013.01); *F23R 3/06* (2013.01); *F23R 3/42* (2013.01); *F05D 2260/963* (2013.01); *F23M 2900/05004* (2013.01); *F23R 2900/00014* (2013.01); *F23R 2900/00017* (2013.01); *F23R 2900/00018* (2013.01); *F23R 2900/03042* (2013.01); *F23R 2900/03044* (2013.01); *Y10T 29/49323* (2015.01)

(58) Field of Classification Search
CPC .............. F02C 7/24; F05D 2260/962; F05D 2260/963; F23R 3/002; F23R 3/06; F23R 2900/00014; F01N 1/023; F23M 20/005
See application file for complete search history.

(56) References Cited

U.S. PATENT DOCUMENTS 6,530,221 B1 * 3/2003 Sattinger et al. ................ 60/725
6,837,051 B2   1/2005 Mandai et al.
(Continued)

FOREIGN PATENT DOCUMENTS

EP    1510757 A2    3/2005
EP    1882883 A2    1/2008

*Primary Examiner* — Gerald L Sung
*Assistant Examiner* — Scott Walthour

(57) ABSTRACT

A combustor (100) for a gas turbine engine (30) has a circumferentially extending liner (109) defining at least a portion of an interior combustion chamber (107) and a hot gas path (115). The liner includes a resonator section (112) including at least one resonator (116A, 116B) having a resonator chamber (125A, 125B) formed on an exterior of the liner. A thermal barrier coating (118) is disposed along an inner surface of the liner including an inner surface (130) of the resonator section. The resonator further includes a plurality of apertures (117) and each aperture extends through the liner and the thermal barrier coating at the resonator section and there is fluid flow communication between the combustion chamber and the resonator chamber.

14 Claims, 7 Drawing Sheets

(51) Int. Cl.
  *F23R 3/42*  (2006.01)
  *F23M 20/00*  (2014.01)

(56) References Cited

U.S. PATENT DOCUMENTS

| | | | |
|---|---|---|---|
| 7,413,053 | B2 | 8/2008 | Wasif et al. |
| 7,549,506 | B2 | 6/2009 | Sattinger |
| 7,788,926 | B2 | 9/2010 | Johnson et al. |
| 8,146,364 | B2 | 4/2012 | Johnson et al. |
| 2003/0233831 | A1* | 12/2003 | Suenaga ............ F23M 20/005 60/725 |
| 2004/0248053 | A1* | 12/2004 | Benz et al. .................... 431/114 |
| 2005/0097890 | A1* | 5/2005 | Ikeda et al. ...................... 60/748 |
| 2007/0102235 | A1* | 5/2007 | Tobik et al. ..................... 181/250 |
| 2009/0084100 | A1 | 4/2009 | Johnson et al. |
| 2011/0138812 | A1 | 6/2011 | Johnson |
| 2011/0302924 | A1 | 12/2011 | Lee et al. |

* cited by examiner

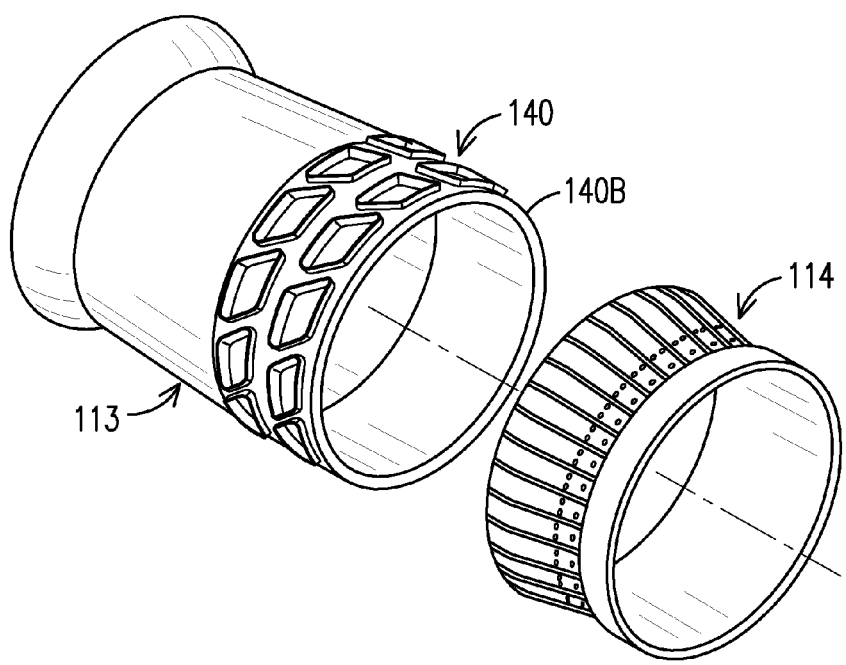
FIG. 10
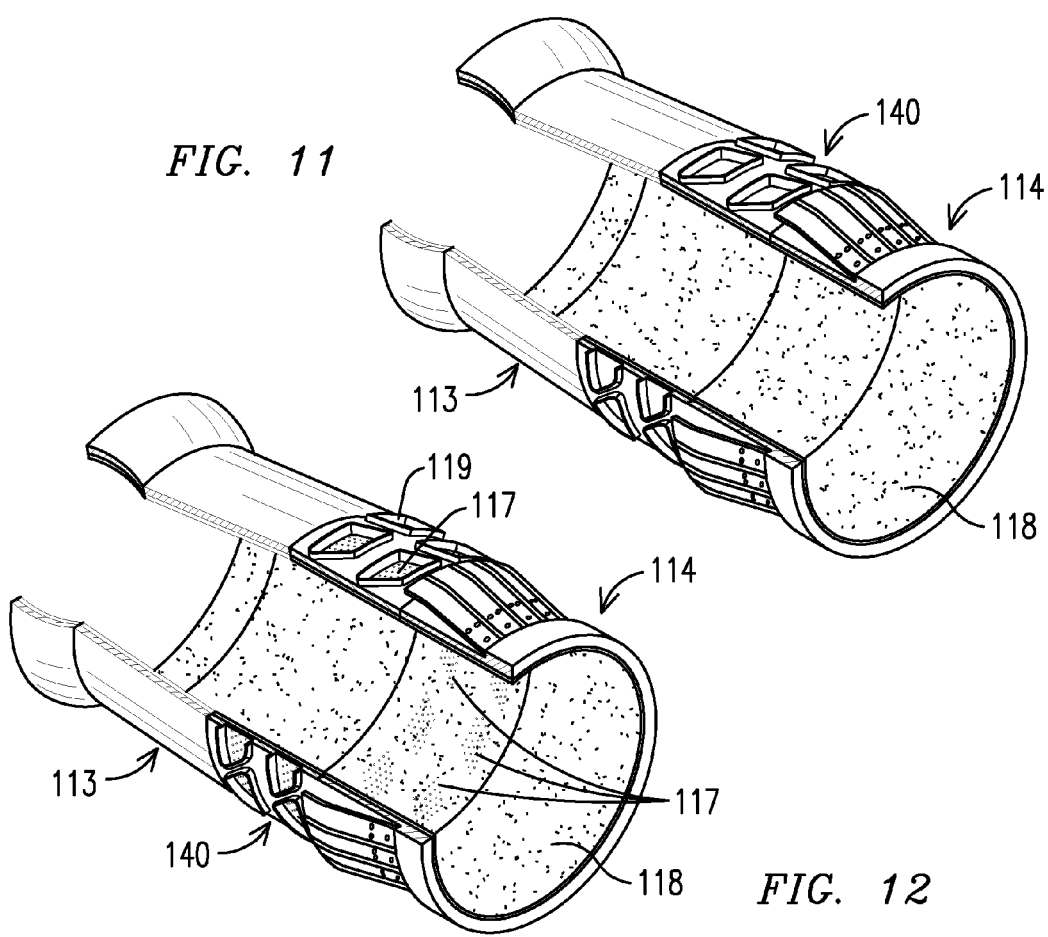
FIG. 11
FIG. 12

US 9,395,082 B2

COMBUSTOR RESONATOR SECTION WITH AN INTERNAL THERMAL BARRIER COATING AND METHOD OF FABRICATING THE SAME

This application claims benefit of the 23 Sep. 2011 filing date of U.S. provisional patent application No. 61/538,399 which is incorporated by reference herein.

FIELD OF THE INVENTION

This invention generally relates to gas turbine engines and, more specifically, to resonators positioned on a combustor of a gas turbine engine.

BACKGROUND OF THE INVENTION

Combustion engines such as gas turbine engines are machines that convert chemical energy stored in fuel into mechanical energy useful for generating electricity, producing thrust, or otherwise doing work. These engines typically include several cooperative sections that contribute in some way to this energy conversion process. In gas turbine engines, air discharged from a compressor section and fuel introduced from a fuel supply are mixed together and burned in a combustion section or combustion chamber. The products of combustion are harnessed and directed through a turbine section, where they expand and turn a central rotor.

A variety of combustor designs exist, with different designs being selected for suitability with a given engine and to achieve desired performance characteristics. One popular combustor design includes a centralized pilot burner (hereinafter referred to as a pilot burner or simply pilot) and several main fuel/air mixing apparatuses, generally referred to in the art as injector nozzles, arranged circumferentially around the pilot burner. With this design, a central pilot flame zone and a mixing region are formed. During operation, the pilot burner selectively produces a stable flame that is anchored in the pilot flame zone, while the fuel/air mixing apparatuses produce a mixed stream of fuel and air in the above-referenced mixing region. The stream of mixed fuel and air flows out of the mixing region, past the pilot flame zone, and into a main combustion zone of a combustion chamber, where additional combustion occurs. Energy released during combustion is captured by the downstream components to produce electricity or otherwise do work.

It is known that high frequency pressure oscillations may be generated from the coupling between heat release from the combustion process and the acoustics of the combustion chamber. If these pressure oscillations, which are sometimes referred to as combustion dynamics, or as high frequency dynamics, reach a certain amplitude they may cause nearby structures to vibrate and ultimately break. A particularly undesired situation is when a combustion-generated acoustic wave has a frequency at or near the natural frequency of a component of the gas turbine engine. Such adverse synchronicity may result in sympathetic vibration and ultimate breakage or other failure of such component.

Various resonator boxes for the combustion section of a gas turbine engine have been developed to damp such undesired acoustics and reduce the risk of the above-noted problems. FIG. 1A provides a perspective view of a prior art combustor liner 10 with a resonator section 11. As shown, along a cylindrical region 20 of the combustor liner 10 are respective arrays 12 of apertures 13 of adjacent resonators. Resonators 14 are shown complete with resonator boxes 15 in place, and two arrays 12 of apertures 13 are shown with the resonator boxes 15 removed.

As shown in FIG. 2 the resonator box 15 has sidewalk 16 that are welded to an outside surface of the combustion liner 10. In addition, the resonator boxes 15 have an array of impingement air holes 17 on a top plate or wall 18, an array of impingement holes 17 typically follows the same geometric shape of the array 12 of apertures 13 on the liner 10 and the air holes 17 are typically staggered relative to the apertures. In addition, thermal barrier coatings are disposed on the interior (exposed to combustion gases) surface of liner 10 respectively upstream and downstream of the cylindrical region 20 of the liner 10 which comprises the resonators 14, but not throughout the cylindrical region 20, which remains uncoated. The uncoated region is predominantly cooled by a combination of cooling from the impingement air holes 17 and film cooling from air flow exiting through the apertures 13.

As the demands on power generation increase and turbines are designed for more efficient production of power output, the operating temperatures of the turbine components increase. In particular, the temperatures within combustion chambers are ever increasing as a result of higher firing temperatures, use of alternative fuels or fuel flow biasing from different injection stages, for example. To provide sufficient cooling, making the apertures in the liner larger will increase NOx emissions and will not provide protection against oxidation. Accordingly, a thermal barrier coating (TBC) is needed along the inner surface of the combustion liner at the region defined by the resonators, at a resonator section of a combustion liner.

However, current masking techniques to cover apertures during deposition of a thermal barrier coating are too time consuming and costly. In addition, typical masking materials such as polymer masking cannot be used with some deposition techniques such as dense vertical cracked TBC, which may destroy the masking material during deposition. In addition, some masking techniques, such as the use of polymer materials to clog and cover holes, and as done in the fabrication of other components of a turbine engine, form an uncontrolled halo or undercoating around the apertures because of manual processes involved. If halos exist at the apertures, then the resonator would not meet its targeted frequency requirements. In addition, weld heat generated when welding the boxes directly to the outer surface of the liner may damage the TBC. Moreover, whether or not a TBC is applied to a resonator region of a liner, the weld at the surface of the liner creates a high stress area as the combustion chamber operates at such high temperatures.

BRIEF DESCRIPTION OF THE DRAWINGS

The invention is explained in the following description in view of the drawings that show:

FIG. 10 is the liner section of FIGS. 7 and 8 being affixed at a downstream end to a third liner section.

FIG. 11 is a sectional view of the assembled combustor liner with a thermal barrier coating (TBC) having been applied to an inner surface of the combustor liner.

FIG. 12 is a sectional view of the assembled combustor with apertures having been formed through the TBC and liner.

DETAILED DESCRIPTION OF THE INVENTION

Figure 1:
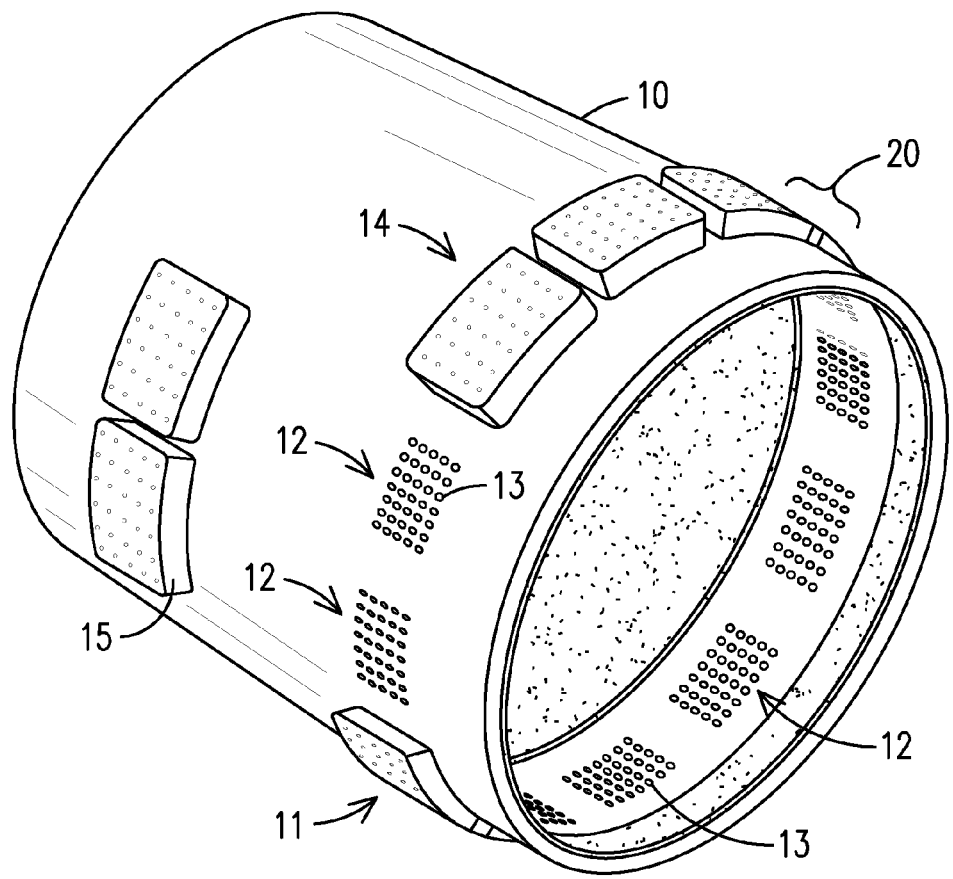
FIG. 1 is a perspective view of a prior art combustor liner with resonators disposed thereon.
Figure 2:
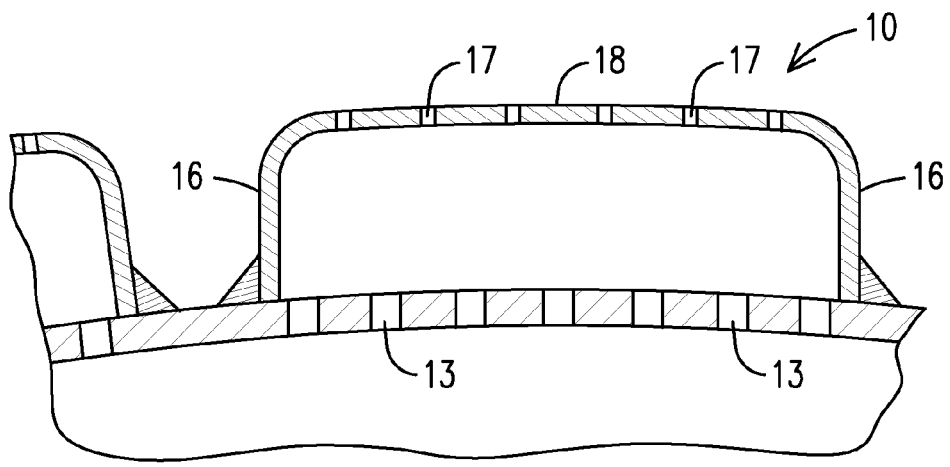
FIG. 2 is a cross-sectional view of a prior art resonator from FIG. 1.
Figure 3:
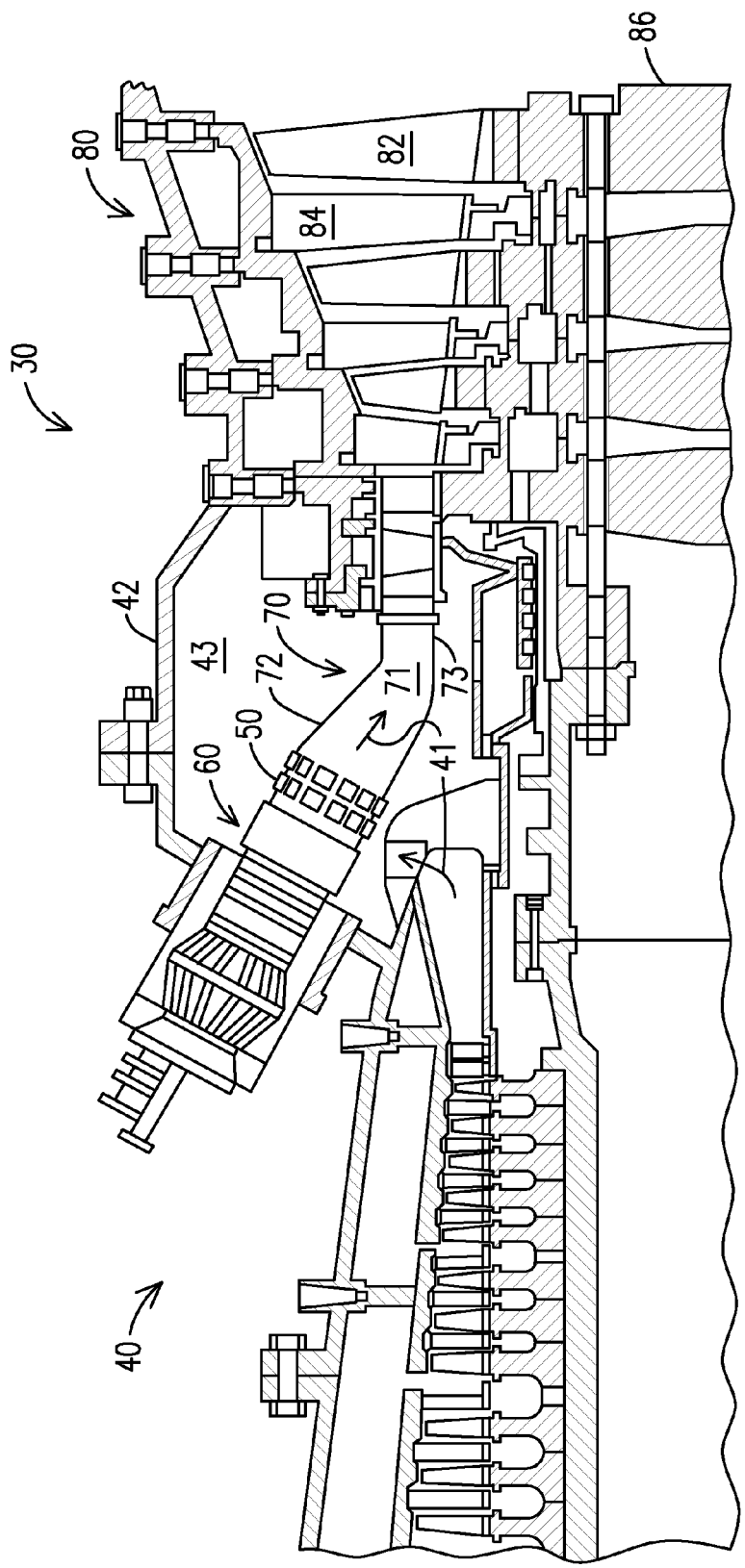
FIG. 3 is a cross-sectional view of gas turbine engine power plant.

With respect to FIG. 3, a sectional side view of gas turbine power plant 30 is illustrated. As shown in FIG. 1, a combustion turbine power plant 30 includes a compressor assembly 40, a combustor assembly 60, a transition section 70, and a turbine assembly 80. The compressor assembly 40, combustor assembly 60, transition section 70, and turbine assembly 80, define a flow path 41. The combustor assembly 60 may be a can-annular or annular combustor assembly.

The compressor assembly 40 includes a plurality of rotating blades and stationary vanes structured to compress a fluid. The combustor assembly 60 is disposed within a casing 42. The casing 42 defines a plenum 43. Compressed air from the compressor assembly 40 is delivered to the plenum 43. The combustor assembly 60 is coupled to a fuel source (not shown). Within the combustor assembly 60, compressed air and fuel are mixed, ignited and consumed in a combustion zone, thereby creating a working gas. The working gas is delivered through flow path 41 within the transition section 70. Transition section 70 is also disposed within casing 42 in the plenum 43. The transition section 70 includes a housing 71 that typically has a portion with cylindrical cross section 72 and a portion with a rectangular cross section 73.

The flow path 41 extends through the transition section 70 into the turbine assembly 80. The turbine assembly 80 includes a plurality of rotating blades 82 and stationary vanes 84. As the working gas expands through the turbine assembly 80, the rotating blades 82, which are coupled to a shaft 86, formed by a plurality of rotors, rotate, thereby creating a mechanical force. The shaft 86 may be coupled to a generator, which produces power.

In operation, the compressor assembly 40 inducts ambient air and compresses the air. The compressed air is channeled through the flow path 41 to the combustor assembly 60. Within the combustor assembly 60, the compressed air is combined with a fuel and ignited. The fuel air mixture is frequently a fuel lean mixture. When the fuel is consumed in the combustor assembly 60, a working gas is formed. The working gas travels through the flow path 41 to the transition section 70, within housing 71, and is then expanded through the turbine assembly 80.

Fluctuations in the rate of fuel consumption create a standing acoustical pressure wave, e.g., a sound wave, which extends through the flow path 41 both upstream and downstream of the combustor assembly 60. When the combustion turbine power plant 30 is in a steady state of operation, the peaks of the acoustical pressure waves are relatively stationary. To dampen the damaging effects of the acoustical wave, it is desirable to locate a damping resonator at the location of the peaks of the wave. An exemplary embodiment of the present invention disposes at least one resonator 50 along the flow path 41 in close proximity to the combustion zone of combustor assembly 60.

Figure 4:
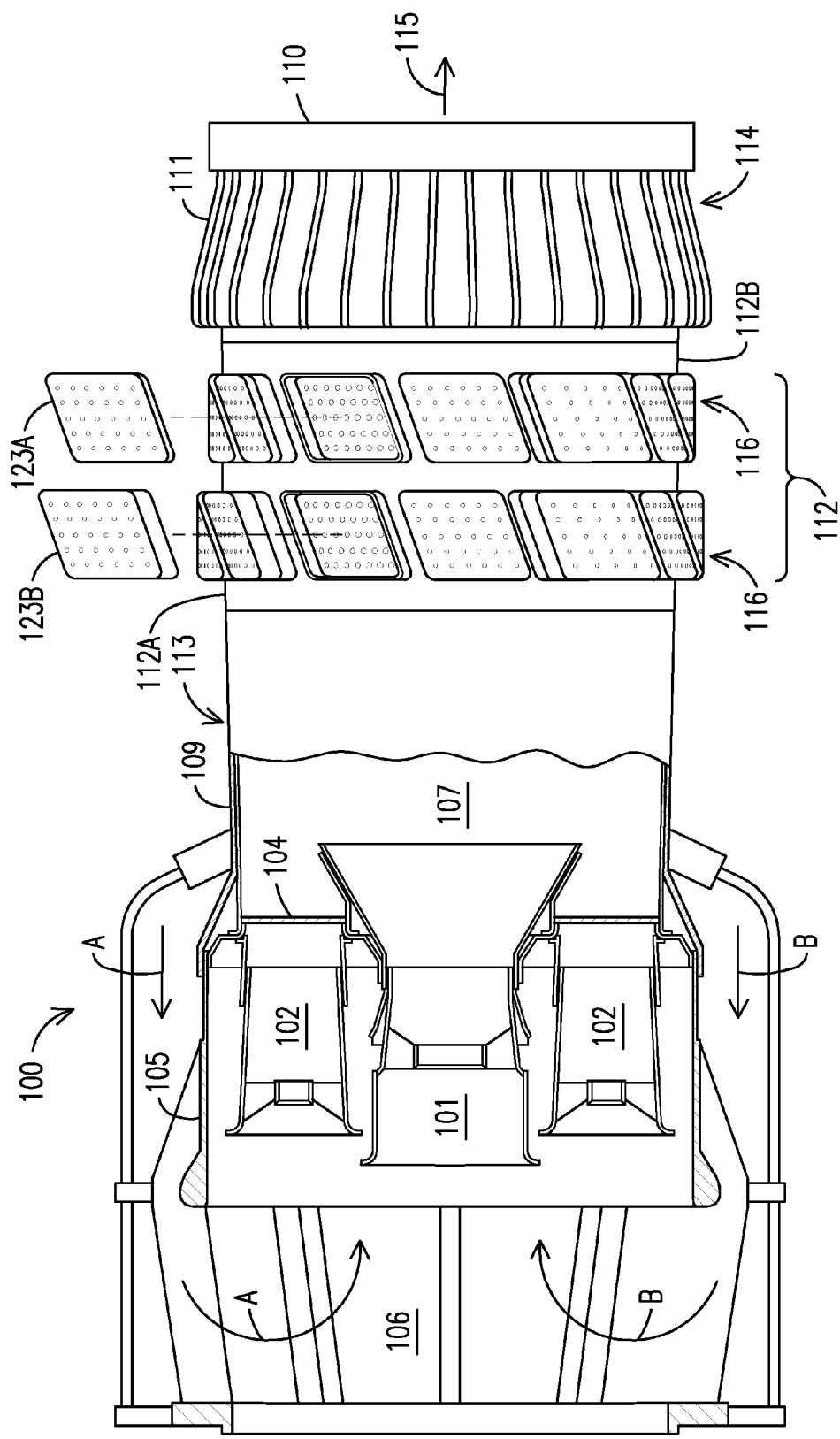
FIG. 4 is a side and partial sectional view of the combustor of a gas turbine engine including the resonators of the subject invention.

FIG. 4 provides a side view of a combustor 100 with the resonator section 112 and resonators 116 of the subject invention. While not meant to be limiting, the combustor 100 is comprised of a pilot swirler assembly 101 (or more generally, a pilot burner), and disposed circumferentially about the pilot swirler assembly 101 are a plurality of main swirler assemblies 102. These are contained in a combustor housing 105. Fuel is supplied to the pilot swirler assembly 101 and separately to the plurality of main swirler assemblies 102 by fuel supply rods (not shown). A transversely disposed base plate 104 of the combustor 100 receives downstream ends of the main swirler assemblies 102.

During operation, a predominant air flow from the compressor assembly (see FIG. 3) passes along the outside of a combustor housing 105 and into an intake 106 of the combustor 100 as represented by arrows A and B. The pilot swirler assembly 101 operates with a relative richer fuel/air ratio to maintain a stable inner flame source, and combustion takes place downstream, particularly in a combustion chamber 107 largely defined upstream by the base plate 104 and laterally by a combustor liner 109. An outlet 110 at the downstream end of combustor 100 passes combusting and combusted gases to a transition section (not shown, see FIG. 3), which is joined by means of a combustor-transition interface seal, part of which comprises a spring clip assembly 111.

In an embodiment of the invention, the combustor liner 109 may comprise three sections including the resonator section 112 (or first section), a second section 113 affixed to an upstream end 112A of the resonator section 112 and a third section 114 affixed to a downstream end 112B of the resonator section 112. In other embodiments the combustor liner 109 may be comprised of only a single liner section or two or more liner sections. The resonator section 112 is preferably positioned on the combustor 100 and/or combustor liner so it extends circumferentially and defines at least a portion of the combustion chamber 107 and a hot flow gas path represented by arrow 115. In addition, and as will be described in more detail below, a thermal barrier coating (TBC) 118 is disposed along inner surfaces of the combustor liner 109, including an inner surface 130 of the resonator section 112.

Figure 5:
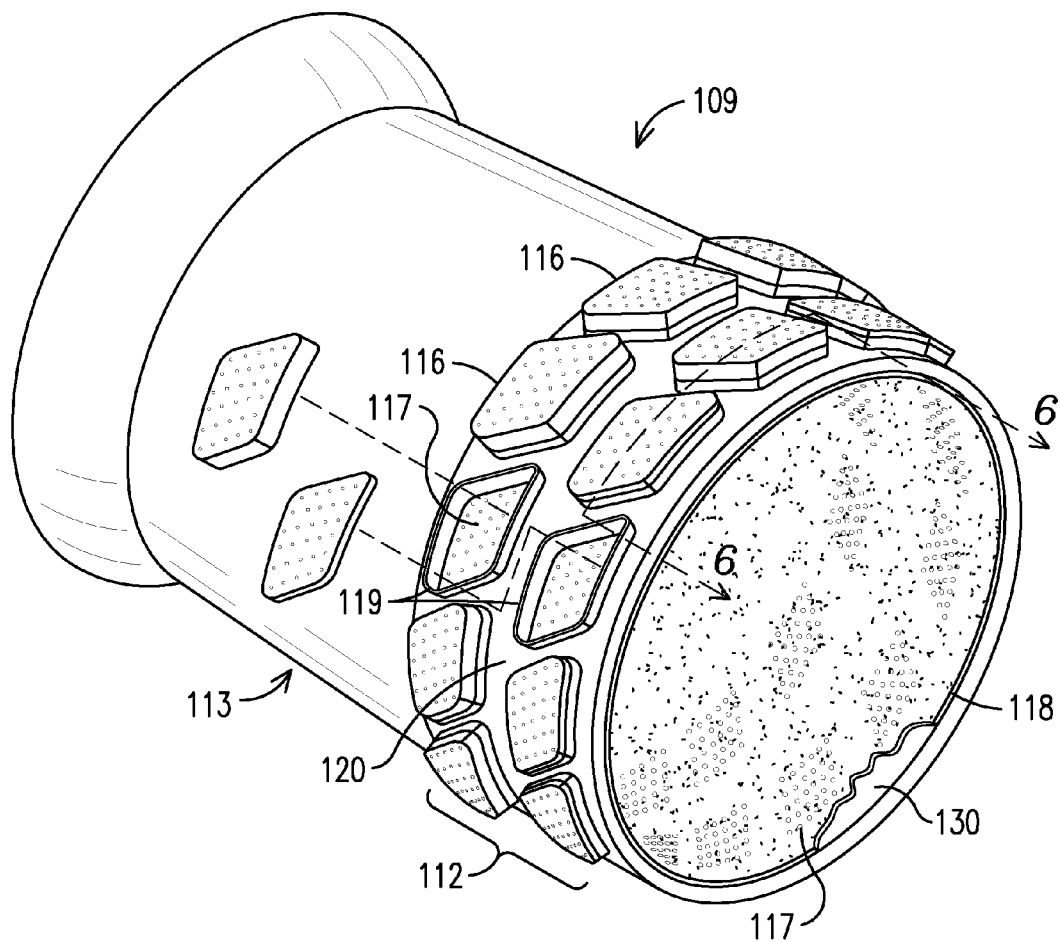
FIG. 5 is a perspective view of a combustor liner with resonators of the subject invention.

As shown in FIGS. 4 and 5, a plurality of resonators 116 are spaced apart and disposed on the resonator section 112. In the embodiment shown, the resonators 116 are disposed in two rows that extend circumferentially around the resonator section 112. Each resonator 116 comprises an array of apertures 117 wherein each aperture 117 has a neck length such that the aperture extends through both the liner 109 and the TBC 118 at the resonator section 112. The array of apertures 117 for a resonator 116 is surrounded by an enclosed sidewall 119 that is integrally formed with the liner 109 at the resonator section 112 and projects outwardly from an outer surface 120 of the liner 109. The terms "integral" or "integrally" as used in the context of describing the sidewalls 119 are intended to mean that the sidewalls are formed by machining, milling or other fabricating techniques wherein a surface of a sheet metal or metal plate is treated and metallic material is removed forming the sidewalls 119. The terms "integral" or "integrally" are not intended to encompass, for example, prior art resonators that include resonators boxes that are components separate and apart from a combustor liner that have sidewalls that must be welded or otherwise affixed to the outer surface of the liner to form a resonator.

Figure 6:
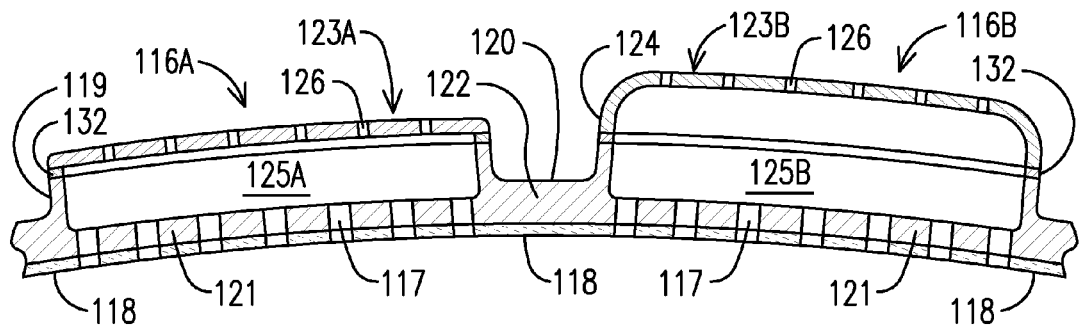
FIG. 6 is a cross-section elevational view of resonators of the subject invention taken along lines 6-6 of FIG. 5.
Figure 7:
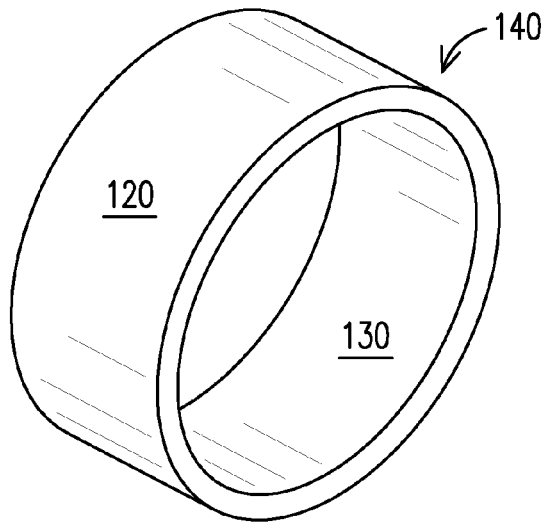
FIG. 7 is a perspective view of combustor liner section formed in initial steps of assembly of a resonator section of a combustor.
Figure 8:
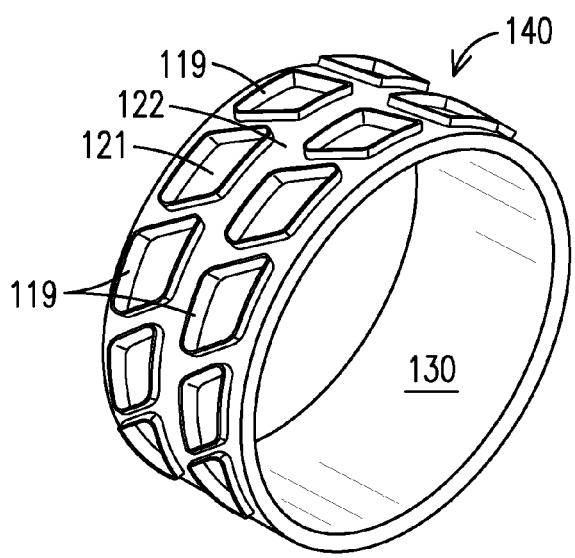
FIG. 8 is the liner section of FIG. 7 with resonator sidewalls machined thereon.
Figure 9:
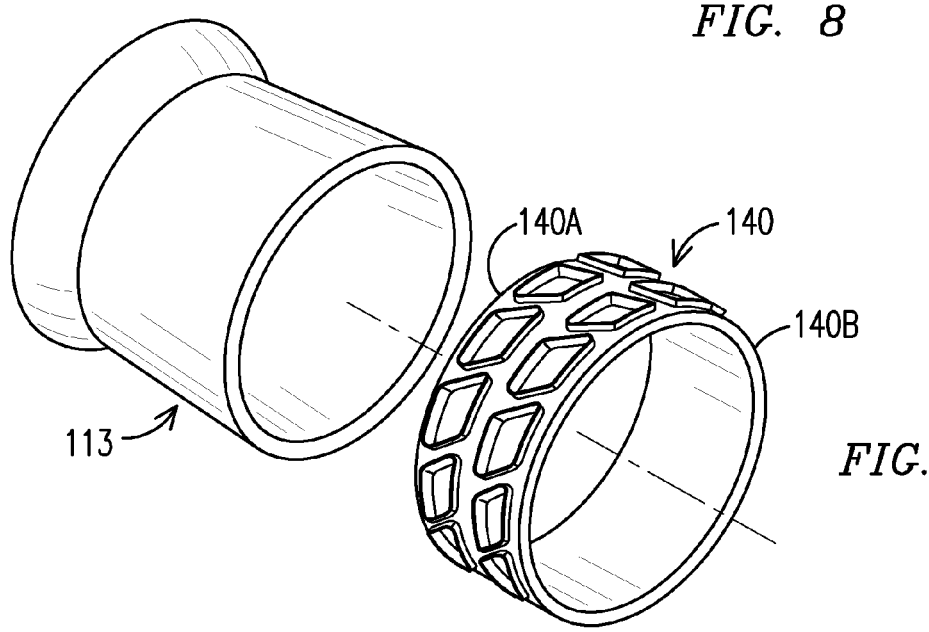
FIG. 9 is the liner section of FIGS. 7 and 8 being affixed at an upstream end to another combustor liner section.
Figure 13:
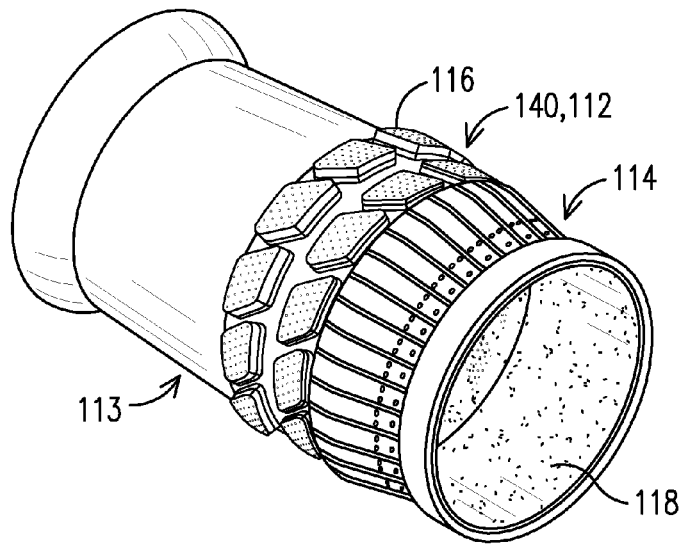
FIG. 13 is perspective view of the assembled combustor liner with end caps affixed to sidewalls to form the resonators and resonator section.

While not being limited, the resonator section 112 may be fabricated by rolling a substantially rectangular, metal plate or sheet and welding the ends of the plate or sheet together to conform to the circular cross sectional shape of the combustor liner 109. The outside surface 120 of the plate is then machined using known automated machining techniques to form the sidewalls 119 which may be about 6 mm in length. In addition, and as shown in FIG. 6, liner portion 121 within the area defined by the enclosed sidewall 119 is machined to a thickness which is thinner or less than a thickness of the liner portions 122 that are outside the enclosed sidewall 119 or between respective resonators 116. For example, liner portions 121 may be machined to a thickness of 1.5 mm and liner portions 122 may be about 2.3 mm. The dimensions described herein are provided by way of example and may vary according to the resonator demands or target frequencies of the resonators for a given combustor.

As is known to those skilled in the art the thickness of a liner within a resonant chamber is selected to meet a target frequency or frequency range and damping amplitude of the resonator chamber. The prior art combustion liners for a resonator section have a uniform thickness across the resonator section including within and outside the resonator chamber. That is, an entire surface of a metal plate is machined so that all areas of the liner have the same thickness, in part because the resonator boxes have to be attached to the surface. However, machining all areas of the liner to the same thickness as that of the resonator chamber, may compromise the structural integrity of the combustor liner at the resonator section. For embodiments of the invention, the thicker liner portions 122 enhance the overall mechanical stability of the resonator section.

Two resonators 116A and 116B are illustrated in FIG. 6, and each resonator 116A, 116B includes an end cap 123A, 123B respectively affixed to a sidewall 119 to form the resonator chambers 125A, 125B. As shown, the end caps 123A, 123B each has impingement holes 126 so that there is fluid flow communication between the combustion chamber 107 and plenum 43 of the combustion assembly 60. The end caps 123A and 123B may have different configurations so the resonator chambers 125A, 125B have different volumes to account for frequency pressure oscillations that may occur over a range of frequencies. By way of example, end cap 123A is a generally flat plate affixed to sidewall 119; and, end cap 123B includes a rim 124 integrally formed with a generally flat portion and the rim 124 is affixed to the sidewall 119 of a resonator 116. This rim 124 adds a length or height dimension to resonator 116B to define resonator chamber 125B having a volume that is greater than the volume of resonator chamber 125A.

In either example, the end plates 123A, 123B are affixed to the sidewalls 119 along a site or location 132 on the sidewalls 119 that is spaced radially outward from the outside surface 120 of the liner 109 at the resonator section 112. In this manner, the weld location between the sidewalls 119 and end caps 123A or 123B is not on the surface of the resonator section 112 as compared to the prior art resonator boxes that are welded directly to the surface of a resonator section. Spacing the weld location 132 outward from the surface 120 displaces the weld site away from the hot surface of the resonator section 112. Combustion chambers can operate at temperatures of up to 700° C. or more creating a high stress area if a weld is formed thereon. In addition, by spacing the weld site from the outer surface 120, the caps 123A, 123B can be welded to sidewalls 119 without damaging the TBC 118.

Figure 14:
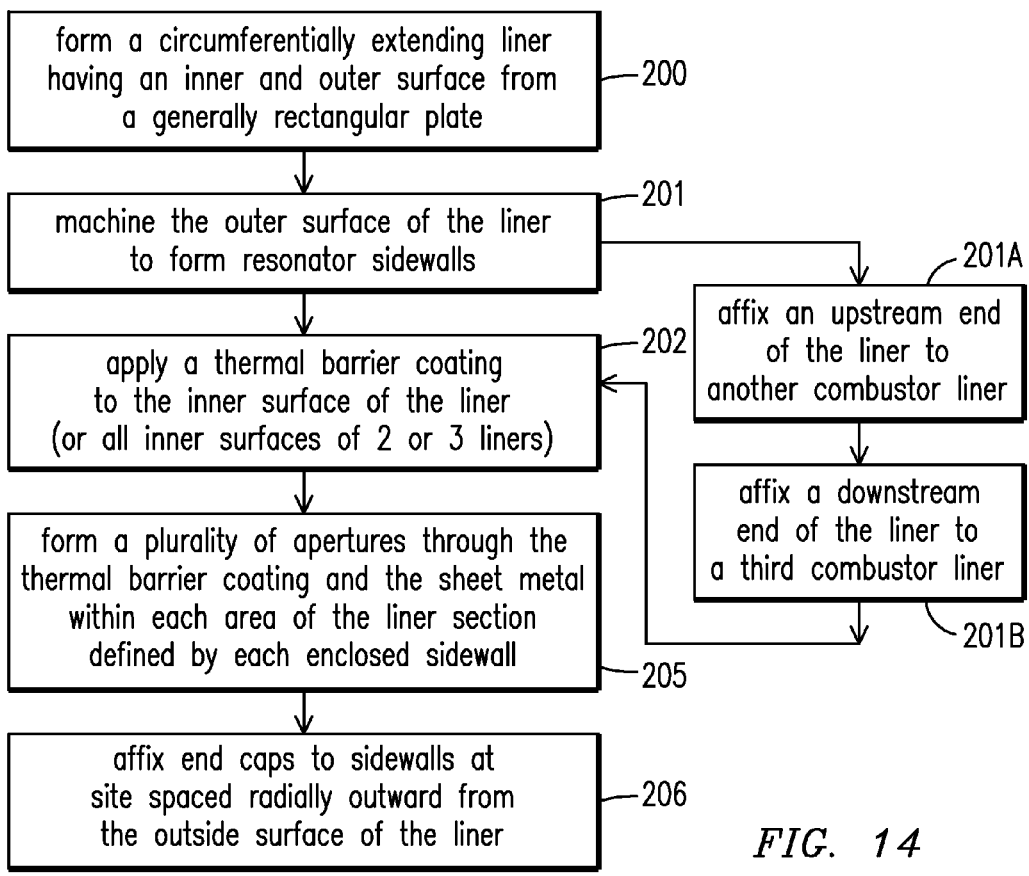
FIG. 14 is a flowchart listing steps of a method of fabricating and assembling a combustor and/or resonator section of a combustor.

A method of fabricating and assembling a combustor and/or resonator section of a combustor is now described in reference to FIGS. 7-13, which illustrate the fabrication and/or assembly of the resonator section 112, combustor liner 109 and/or combustor 100, and FIG. 14, which includes a flowchart listing steps of the method. In a first step 200, a circumferentially extending resonator liner section 140 having an inner surface 130 and outer surface 120 is formed from a generally rectangular plate. For example, a ½ inch thick metal plate is rolled and ends of the plate are welded together to form the liner section 140 shown in FIG. 7.

In a next step 201, the outer surface 120 of the liner section 140 is machined to remove metal and reduce the thickness of the liner section 140 and form sidewalls 119. As described above, the liner portions 121 within the sidewalls 119 are machined to a thickness that is thinner than a thickness of liner portions 122 outside and/or between respective sidewalls 119.

Then at step 202 (FIG. 11) a thermal barrier coating 118 is applied to the inner surface 130 of the liner section 140. If the liner section 140 is to form only a section of the combustor liner 109, and other liner sections are incorporated, then at step 201A (FIG. 9) an upstream end 140A of the liner section 140 is affixed to a second liner section 113, and at step 201B (FIG. 10) a downstream end 140B of the liner section 140 is affixed to a third liner section 114. If more than one liner section is used to form the combustor liner 109, steps 201A and 201B are performed before step 202 in which case the TBC 118 is applied to all inner surfaces of the liner sections as shown in FIG. 11. If only two liner sections are used then one of steps 201A and 201B may be eliminated; and, it is possible that liner section 140 may form the entire combustor liner 109, in which case steps 201A and 201B are both eliminated.

After the TBC 118 is applied to the inner surfaces of liner sections 140, 113 and/or 114, then apertures 117 are formed within areas defined by the sidewalls 119 and through the TBC 118 and liner section 140 at step 205 (FIG. 12). Known cutting techniques such as water jet and laser cutting techniques may be used to form the apertures 117 wherein a robotic arm preferably having multiple axes of rotation and connected to a water jet or laser source is inserted into an interior chamber formed by the liner 109. The liner 109 and cutting jet are moved relative to one another as the water jet spray or laser jet discretely cuts through the TBC 118 and liner section 140 to form the array of apertures circumferentially spaced on the resonator section 112 of the liner 109. As noted above such techniques in forming apertures in combustor liners is well known to those skilled in the art.

At step 206 (FIG. 13) an end cap 123 is affixed, preferably using butt welding techniques, to each respective resonator sidewall 119. This step 206 is preferably performed after the step 205 of forming the apertures 117 through the TBC 118 and the liner section 140 to avoid back strike during formation of the apertures 117. As described, by positioning the weld cite outwardly from the outer surface 120 of the resonator section 112, 140 the TBC coating 118 can be applied to the inner surface 130 of the liner section 112, 140. Prior art resonator sections do not have a TBC surrounding resonator apertures, because welding on the surface of the resonator section can damage the TBC. In addition, masking techniques cannot practically be implemented to cover the apertures for application of a TBC after resonator boxes are welded to the resonator section.

Other advantages of the above described resonator section include improving the resonator weld life because the resonator sidewalls 119 move the weld away from the thermally stressed liner surface. In addition, displacement of the resonator weld improves resonator aperture life by eliminating welding pre-stress. Moreover, resonator aperture life is extended because a TBC can be applied to the inner surface 130 of the resonator section 112, 140. Overtime, without the TBC present, the size and shape of the apertures may distort which can directly affect the tuning of a resonator shortening the life of the resonator. The apertures may have a diameter of about 1.5 mm and are formed within tolerances of about ±0.05 mm; therefore, application of a TBC becomes critical in extending resonator aperture life and resonator life. By extending the life of the resonator apertures with thermal protection and mechanical integrity, air consumption in the combustion chamber is controlled or reduced over time, which improves NOx emissions over time.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of fabricating and assembling a combustor for a gas turbine engine, the combustor having a resonator section of a combustor liner and a second liner section of the combustor liner that is affixed to an upstream end of the resonator section, the combustor liner defining an interior combustion chamber and a hot gas path and having a plurality of resonators disposed circumferentially on an outer surface of the liner, the method comprising:

forming the resonator section from a generally rectangular metal plate, wherein the resonator section has an inner surface and an outer surface;

applying a thermal barrier coating to the inner surface of the resonator section and a corresponding inner surface of the second liner section;

forming a plurality of resonators on the outer surface of the resonator section, wherein each resonator of the plurality of resonators is formed by:

integrally forming respective one or more outwardly projecting sidewalls on the resonator section by machining the outer surface of the resonator section such that a thickness of the resonator section within a respective area defined by the respective one or more outwardly projecting sidewalls is less than a thickness of the resonator section respectively immediately outside the respective one or more outwardly projecting sidewalls;

forming a respective circumferentially arranged array of apertures through the thermal barrier coating and the resonator section within the respective area defined by the respective one or more outwardly projecting sidewalls, each aperture of the respective circumferentially arranged array of apertures having a neck length such that each aperture extends through the resonator section and the thermal barrier coating;

configuring a respective end cap such that the respective end cap has a height; and affixing the respective end cap to a respective site on the respective one or more sidewalls surrounding the respective circumferentially arranged array of apertures, the site spaced radially outward from an outer surface of the first liner section; and wherein a first plurality of resonators of the plurality of resonators have first resonator chambers with each first resonator chamber having a first volume;

wherein a second plurality of resonators of the plurality of resonators have second resonator chambers with each second resonator chamber having a second volume that is greater than the first volume;

wherein the first plurality of resonators have a first set of respective end caps and the second plurality of resonators have a second set of respective end caps; and wherein the height of each respective end cap of the first set of respective end caps comprises a first height and the height of each respective end cap of the second set of respective end caps comprises a second height which is greater than the first height, thereby causing the second volume to be greater than the first volume.

2. The method of claim 1, further comprising configuring each respective end cap to have a geometric peripheral shape that matches a corresponding geometric peripheral shape of the respective one or more outwardly projecting sidewalls.

3. The method of claim 2, further comprising forming a respective plurality of impingement holes in each respective end cap.

4. The method of claim 3, further comprising affixing a downstream end of the resonator section to a third liner section of the combustor liner.

5. A combustor for a gas turbine engine, comprising:

a circumferentially extending liner defining at least a portion of an interior combustion chamber;

a resonator section of the circumferentially extending liner comprising at least one resonator on the circumferentially extending liner, the at least one resonator including a resonator chamber formed on an outer surface of the circumferentially extending liner; and a thermal barrier coating disposed along an inner surface of the circumferentially extending liner including an inner surface of the resonator section;

wherein the at least one resonator further comprises one or more outwardly projecting sidewalls surrounding a plurality of apertures and each aperture has a neck length such that each aperture extends through the circumferentially extending liner at the resonator section and through the thermal barrier coating and there being fluid flow communication between the interior combustion chamber and the resonator chamber;

wherein the one or more outwardly projecting sidewalls are integrally formed with the circumferentially extending liner, wherein a thickness of the circumferentially extending liner within the resonator chamber is less than a thickness of the circumferentially extending liner immediately outside of the resonator chamber at the resonator section; and wherein the at least one resonator further comprises an end cap affixed to a site on the one or more outwardly projecting sidewalls, the site spaced radially outward from the outer surface of the circumferentially extending liner;

wherein the at least one resonator has a first volume that is greater than a second volume of a second resonator located on the circumferentially extending liner, the second resonator comprising respective one or more outwardly projecting sidewalls integrally formed with the circumferentially extending liner; and wherein the end cap of the at least one resonator comprises a first height and a second end cap of the second resonator comprises a second height which is greater than the first height, thereby causing the first volume to be greater than the second volume, wherein the second end cap is affixed to the respective one or more outwardly projecting sidewalls of the second resonator.

6. The combustor of claim 5, wherein the one or more outwardly projecting sidewalls are formed on the circumferentially extending liner by reducing a thickness of portions of the circumferentially extending liner.

7. The combustor of claim 6, wherein the thickness of portions of the circumferentially extending liner is reduced by machining away the portions of the circumferentially extending liner.

8. A combustor for a gas turbine engine, comprising:
a circumferentially extending liner defining at least a portion of an interior combustion chamber and a hot gas path;
a resonator section of the circumferentially extending liner comprising at least one resonator on the circumferentially extending liner including one or more outwardly projecting sidewalls on an exterior surface of the circumferentially extending liner and an end cap affixed to the one or more outwardly projecting sidewalls forming a resonator chamber on the exterior surface of the circumferentially extending liner; and
the at least one resonator further comprises a plurality of apertures in the circumferentially extending liner within an area defined by the one or more outwardly projecting sidewalls, wherein the one or more outwardly projecting sidewalls are integrally formed with the circumferentially extending liner allowing fluid flow communication between the interior combustion chamber and the resonator chamber;
wherein the end cap is affixed to a site on the one or more outwardly projecting sidewalls spaced radially outward from the exterior surface of the circumferentially extending liner;
wherein the circumferentially extending liner has a thickness within the area defined by the one or more outwardly projecting sidewalls that is less than a thickness of the circumferentially extending liner immediately outside the area defined by the one or more outwardly projecting sidewalls;
the combustor further comprising a thermal barrier coating disposed along an inner surface of the circumferentially extending liner including an inner surface of the resonator section and each of the apertures has a neck length such that each of the apertures extends through the circumferentially extending liner and the thermal barrier coating at the resonator section;
wherein the at least one resonator has a first volume that is greater than a second volume of a second resonator located on the circumferentially extending liner, the second resonator comprising respective one or more outwardly projecting sidewalls integrally formed with the circumferentially extending liner; and
wherein the end cap of the at least one resonator comprises a first height and a second end cap of the second resonator comprises a second height which is greater than the first height, thereby causing the first volume to be greater than the second volume, wherein the second end cap is affixed to the respective one or more outwardly projecting sidewalls of the second resonator.

9. A combustor for a gas turbine engine comprising:
a combustor liner defining an interior combustion chamber and a hot gas path and comprising a first liner section having an upstream end and a second liner section that is affixed to the upstream end of the first liner section;
a thermal barrier coating disposed along inner surfaces of the first and second liner sections;
a plurality of resonators formed on an exterior of the first liner section and comprising a plurality of circumferentially arranged arrays of apertures in the first liner section that have neck lengths such that each aperture extends through the first liner section and the thermal barrier coating;
each respective resonator of the plurality of resonators comprises a respective array of apertures of the plurality of circumferentially arranged arrays of apertures, with each respective array of apertures being surrounded by respective one or more outwardly projecting sidewalls that are integrally formed with the first liner section, wherein a thickness of the first liner section respectively within the respective one or more outwardly projecting sidewalls of each respective resonator is less than a thickness of the first liner section respectively immediately outside the respective one or more outwardly projecting sidewalls;
wherein each respective resonator further comprises a respective end cap affixed to the respective one or more sidewalls surrounding the respective array of apertures and each respective end cap is affixed to a respective site on the respective one or more sidewalls spaced radially outward from an outer surface of the first liner section;
wherein a first plurality of resonators of the plurality of resonators have first resonator chambers with each first resonator chamber having a first volume and a second plurality of resonators of the plurality of resonators have second resonator chambers with each second resonator chamber having a second volume that is greater than the first volume; and
wherein the first plurality of resonators have a first set of respective end caps and the second plurality of resonators have a second set of respective end caps, wherein each respective end cap of the first set of respective end caps comprises a first height and each respective end cap of the second set of respective end caps comprises a second height which is greater than the first height, thereby causing the second volume to be greater than the first volume.

10. The combustor of claim 9, wherein the first liner section has a downstream end and the combustion liner further comprises a third liner section affixed to the downstream end of the first liner section.

11. The combustor of claim 10, wherein the thermal barrier coating is also disposed along an inner surface of the third liner section.

12. The combustor of claim 9, further comprising in each respective end cap a plurality of impingement holes.

13. The combustor of claim 9, wherein the plurality of circumferentially arranged arrays of apertures comprises two rows of circumferentially arranged arrays of apertures.

14. The combustor of claim 9, wherein the first plurality of resonators of the plurality of resonators are arranged circumferentially at a separate axial location than the second plurality of resonators of the plurality of resonators.

* * * * *